Patented Jan. 17, 1950

2,494,593

UNITED STATES PATENT OFFICE 2,494,593

RECLAIMING RUBBER

Edward F. Sverdrup, Buffalo, N. Y., assignor to U. S. Rubber Reclaiming Company, Inc., Buffalo, N. Y., a corporation of New York No Drawing. Application September 20, 1947, Serial No. 775,383

10 Claims. (Cl. 260—2.3)

This invention relates to the preparation of vulcanizable natural and synthetic rubbers of plasticity suitable for compounding and molding, and particularly to the devulcanization of rubber. Among the most effective procedures used for this purpose prior to my present invention is the heating of vulcanized rubber in the presence of aliphatic or aromatic sulfur compounds.

I have now found that when vulcanized rubber or other tough diolefine polymer material is heated with small quantities of thiophene or its derivatives, a remarkably efficient and satisfactory devulcanization results. An oxidized form of a reversibly oxidizable group (oxidation-reduction series) of the type set forth in U. S. Patent No. 2,415,449 may advantageously be included in a side chain attached to the thiophene ring. Especially valuable are those thiophene compounds having sulfur of a disulfide or thiol group directly attached to the thiophene ring. Thiophene thiol in particular I have found to be much more active than the agents heretofore known for the devulcanization of both natural rubber and of synthetic rubbers, especially of the GR-S or Buna S type; and the lower alkyl thiophenes, especially mono-tertiary-butyl thiophene, di-tertiary butyl thiophene, mono-t-octyl thiophene, di-t-octyl thiophene, etc., are equal to the most satisfactory agents used prior to this invention.

The plasticizing and devulcanizing agent of my invention can be used in any of the usual procedures, for example, mixed with finely divided rubber and spread in thin layers on pans and then heated in ovens, or in open steam in an autoclave, or worked at elevated temperature in a closed extruder type plasticator, or in combinations of such procedures.

The rubber (natural or synthetic), if not already in a thin or finely divided form, is desirably sufficiently extended or comminuted either before or during the treatment so that the heat and reclaiming agent may penetrate it rapidly. Thus it may be ground into small particles in the manner usual for reclaiming vulcanized rubber.

The temperature of treatment is ordinarily the same as with ordinary devulcanizing processes. In general it should be above the boiling point of water, advantageously above about 300° F., and below the temperature of thermal decomposition of the rubber. An advantageous range is between 300 and 450° F. The concentration of reclaiming agent in such case may be about 0.05–7% of the weight of scrap rubber with distinct advantage in the range 0.1–4%; and in special but infrequent cases may be profitably as high as 15%. The advantage to be gained from a given increase of concentration of the reclaiming agent diminishes as the concentration increases, and in some cases such increase actually proves a disadvantage.

Heating may be any suitable means e. g., radiant energy, especially infra red radiation; alternating stresses, mechanical or electrical, especially high frequency alternating voltage; milling or mastication, with or without external heating or cooling, or convection heating in autoclaves or ovens.

The time may vary from seconds to hours, depending upon the particular material treated, the particular compound used, and the particular conditions of treatment.

Particularly good results are obtained by treating in an extrusion plasticator at a temperature in the 300–420° F, range for a period of several minutes.

If undue vaporization of the reclaiming agent is to be avoided, it is advantageous to treat the mass of rubber in a confined space in which an appreciable vapor pressure of said agent is maintained. For this reason an extrusion plasticator or an autoclave or enclosed masticating mill, e. g. of the Banbury or Werner-Pfleider types, will be preferable to treatment in open air.

The material after treatment with the thiophene compound is worked in a mill or in a mixer or extruder, all of which I refer to generally as "kneading." This, as already indicated above, may occur in the same apparatus in which the initial heating with the thiophene compound occurs.

The invention in its broader aspects is adapted for reclaiming "rubber-like" materials, which term is employed herein to designate both vulcanized natural rubber and vulcanized synthetic rubber, such, for example, as the copolymers of butadiene and styrene variously known as GR-S and Buna-S, neoprene, Buna-N, etc., and for plasticizing synthetic rubbers which as formed sometimes are too stiff for ordinary use. It is an advantage of the invention that the thiophene compounds act selectively on the synthetic rubber and therefore give a better product from mixed scrap.

Although I am giving below certain specific examples of my invention and its application in practical use and am giving also certain modifications and alternatives, it should be understood that these are not intended to be exhaustive or to be limiting of the invention. On the contrary, I am giving these as illustrations and am giving explanations herein in order to acquaint others skilled in the art with my invention and the principles thereof and a suitable manner of its application in practical use, so that others skilled in the art may be enabled to modify the invention and to adapt it and apply it in numerous forms, each as may be best suited to the requirements of a particular use.

All parts in the following examples are by weight.

*Example I*

95 parts vulcanized natural rubber comminuted to pass a 24 mesh screen are mixed with 0.15 part of thiophene thiol, 1.5 parts of Houdry naphtha, 1.5 parts of engine oil, 0.5 part of lecithin, and 1.5 parts of water, and the mixture forced through an extrusion plasticator such, for example, as the type disclosed in my copending application Serial No. 695,630, filed September 9, 1946, at temperatures of about 340–385° F. at a rate of about 56 pounds per hour and a time in the plasticator of 3.3 minutes. There results a very smooth, soft, and tacky stock having a good tailing separation, with a Williams plasticity number of 4.54 (3' @ 70° C.) and excellent refining qualities.

*Example II*

95 parts of 24 mesh vulcanized Buna S are mixed with 2 parts of thiophene thiol, 1.5 parts of Houdry naphtha, 0.5 part of lecithin, 18 parts of P. R. R. #1[1], and 1.5 parts of water, and the mixture forced through the extrusion plasticator described in said copending application at temperatures of about 340–380° F., a rate of about 45 pounds per hour and a time in the plasticator of 4.1 minutes. There results a soft, very smooth stock which has a Williams plasticity number of 4.21, extrudes well, and is excellently adapted for revulcanization into highly useful products.

*Example III*

95 parts of 24 mesh vulcanized natural rubber are mixed with 0.3 part of thiophene thiol, 1.5 parts of Houdry naphtha, 1.5 parts of engine oil, 0.5 part of lecithin, and 1.5 parts of water, and the mixture forced through an extrusion plasticator at temperatures of about 340–385° F. at a rate of about 78 pounds per hour and a time in the plasticator of 2.4 minutes. There results a good reclaim having a Williams plasticity number of 3.78 and adapted for revulcanization into useful products.

*Example IV*

95 parts of 24 mesh vulcanized natural rubber are mixed with 0.25 part of thiophene thiol, 1.5 parts of Houdry naphtha, 1.5 parts of engine oil, 0.5 part of lecithin, and 1.5 parts of water, and the mixture forced through an extrusion plasticator at temperatures of about 340–380° F. at a rate of about 74 pounds per hour and a time in the plasticator of 2.5 minutes. There results a soft and tacky but satisfactory product having a Williams plasticity number of 3.60.

Instead of all or part of the thiophene thiol in the foregoing examples, dithiophene disulfide may be employed in a ratio of one molecule of dithiophene disulfide to each two molecules of thiophene thiol.

*Example V*

95 parts of 24 mesh natural rubber peels are mixed with 0.5 part of di-tertiary-butyl thiophene, 1.5 parts of Solvesso #3[2], 1.5 parts of engine oil, 0.5 part of lecithin, and 1.5 parts of water, and the mixture forced through an extrusion plasticator at temperatures of about 350–375° F. at a rate of about 57 pounds per hour and a time in the plasticator of 3.3 minutes. There results an excellent reclaim which has a Williams plasticity number of 4.11 and refines satisfactorily.

*Example VI*

95 parts of 24 mesh natural rubber peels are mixed with 0.5 part of mono-tertiary-octyl thiophene, 1.5 parts of Solvesso #3, 1.5 parts of engine oil, 0.5 part of lecithin, and 1.5 parts of water, and the mixture forced through an extrusion plasticator at temperatures of about 350–375° F. at a rate of about 64 pounds per hour and a time in the plasticator of 2.9 minutes. There results an excellent reclaim which has a Williams plasticity number of 4.23 and refines satisfactorily.

*Example VII*

95 parts of 24 mesh natural rubber peels are mixed with 0.5 part of di-tertiary-octyl thiophene, 1.5 parts of Solvesso #3, 1.5 parts of engine oil, 0.5 part of lecithin, and 1.5 parts of water, and the mixture forced through an extrusion plasticator at temperatures of about 350–375° F. at a rate of about 60 pounds per hour and a time in the plasticator of 3.1 minutes. There results an excellent reclaim which has a Williams plasticity number of 4.12 and refines satisfactorily.

*Example VIII*

95 parts of 24 mesh natural rubber peels are mixed with 0.5 part of mono-tertiary-butyl thiophene, 1.5 parts of Solvesso #3, 1.5 parts of engine oil, 0.5 part of lecithin, and 1.5 parts of water, and the mixture forced through an extrusion plasticator at temperatures of about 350–375° F. at a rate of about 59 pounds per hour and a time in the plasticator of 3.2 minutes. There results an excellent reclaim which has a Williams plasticity number of 4.37 and refines satisfactorily.

I claim:

1. A method of plasticizing rubber-like diolefine polymer material which comprises heating such material in the presence of a compound comprising the thiophene ring and thereafter kneading to plasticize the product.

2. The method defined in claim 1 in which the thiophene compound is a lower alkyl thiophene.

3. A method of plasticizing rubber-like diolefine polymer material which comprises heating such material in the presence of butyl thiophene.

4. A method of plasticizing rubber-like diolefine polymer material which comprises heating such material in the presence of octyl thiophene.

5. A method of plasticizing rubber-like diolefine polymer material which comprises heating such material in the presence of thiophene thiol.

6. A method of plasticizing rubber-like copolymers of butadiene and styrene, which comprises

---

[1] P. R. R. #1 is a liquid petroleum resin containing about 65% nonvolatile solids, having an initial boiling point of 380° F. and boiling point of 460° F. after 20% distillation, and having an iodine number of 190, an A. P. I. gravity of 15–18, a specific gravity of .97–.95, a fire point of 190° F./min., a flash point of 175° F./min., and a viscosity at 77.9° F. (Stormer: 100 gr. wt.+100 rev.—sec. 35–40).

[2] A high aromatic petroleum naphtha of boiling range 345–410° F. with a specific gravity of 0.883, an aniline point of 22.7, a flash point of 130° F., an initial boiling point of 347° F., a 50% boiling point of 373° F. and a final boiling point of 412° F. and containing 95% aromatics.

heating such material in the presence of thiophene thiol.

7. A method of plasticizing rubber-like copolymers, of butadiene and styrene, which comprises heating such material in the presence of a lower alkyl thiophene.

8. A method of devulcanizing mixtures of vulcanized natural rubber and a vulcanized rubber-like copolymer of butadiene and styrene, which comprises treating the mixed rubber in intimate admixture with a thiophene compound at temperature above 300° F.

9. A method of plasticizing vulcanized rubber-like diolefine polymer material which comprises heating such material in the presence of a thiophene compound and kneading to plasticize the product.

10. A method of plasticizing vulcanized rubber-like diolefine polymer material which comprises heating such material in the presence of thiophene thiol and kneading to plasticize the product.

EDWARD F. SVERDRUP.

No references cited.